(No Model.)
N. H. BLOOM.
SPRING FOR VEHICLES.
No. 346,085. Patented July 27, 1886.
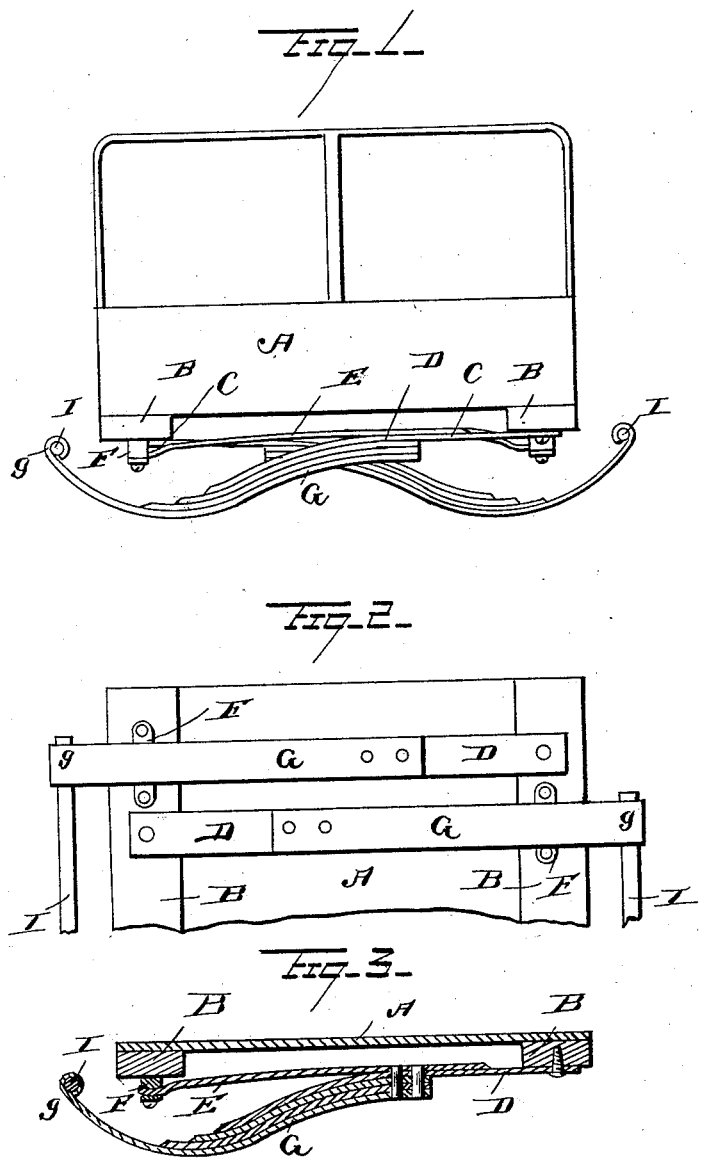
Witnesses
Inventor
N. H. Bloom
By his Attorneys

UNITED STATES PATENT OFFICE.

NICKLAS H. BLOOM, OF CHARLES CITY, IOWA.

SPRING FOR VEHICLES.

SPECIFICATION forming part of Letters Patent No. 346,085, dated July 27, 1886.

Application filed June 12, 1886. Serial No. 204,980. (No model.)

*To all whom it may concern:*

Be it known that I, NICKLAS H. BLOOM, a citizen of the United States, residing at Charles City, in the county of Floyd and State of Iowa, have invented a new and useful Improvement in Springs for Side-Bar Vehicles, of which the following is a specification.

My invention relates to an improvement in springs for side-bar vehicles; and it consists in the peculiar construction and combination of devices, that will be more fully set forth hereinafter, and particularly pointed out in the claims.

In the drawings, Figure 1 is an end elevation of parts of a buggy provided with my improved spring. Fig. 2 is a bottom plan view of the same. Fig. 3 is a transverse section.

A represents the body of the buggy or vehicle, which is provided on its lower side with the usual longitudinal strips or bars, B, that extend below the bottom of the buggy.

C represents a flat spring, one end of which is attached rigidly to the under side of one of the bars B near one end of the body. The said flat spring is made in two leaves or sections, D and E, and extends transversely across the bottom of the buggy-body, the outer end of the outer leaf, E, being secured in a clip, F, with which the bottom of the buggy-body is provided, whereby the said outer end of the leaf E is free to slide in or out in the clip F.

G represents a curved leaf-spring or arm, the upper end of which is attached to the spring C near one end thereof, and the opposite end of the arm or spring G extends outwardly beyond the side of the body, and is provided at its outer end with an eye, g. The said eye is attached to the side bar, I, by means of the usual clip or link. A pair of springs thus constructed are secured at each end of the body of the vehicle, with the arms G extending outwardly in opposite directions, and having their outer ends attached to the side bars. A spring thus constructed prevents side motion or swaying of the body of the vehicle, thus relieving the occupant of unpleasant side strain caused by the swaying to and fro of the vehicle in motion; but the body of the vehicle is free to move vertically to a considerable extent, thus causing it to ride very easily and smoothly.

Having thus described my invention, I claim—

1. The combination, in a side-bar vehicle, of the transverse spring D and E, having one end firmly attached to the bottom of the body of the vehicle and the other end free to move back and forth under the body, and the downwardly and outwardly extending spring-arm G, having its inner end attached to the transverse spring and its outer end attached to the side bar, substantially as described.

2. The combination of the spring comprising the transverse sections D and E, secured together, and having the curved downwardly and outwardly extending arm G, one end of the leaf D being attached firmly to the bottom of the body of the vehicle, and the opposite end thereof bearing on the arm G, the outer end of the leaf or section E being free to move back and forth under the body of the vehicle, and the outer end of the arm G being attached to the side bar, substantially as described.

In testimony that I claim the foregoing as my own I have hereto affixed my signature in presence of two witnesses.

NICKLAS H. BLOOM.

Witnesses:
H. B. TRIGG,
J. F. KENNEDY.